April 25, 1944. W. H. JACKSON 2,347,322
METHOD OF EXTRACTING DRUGS
Original Filed Dec. 31, 1936
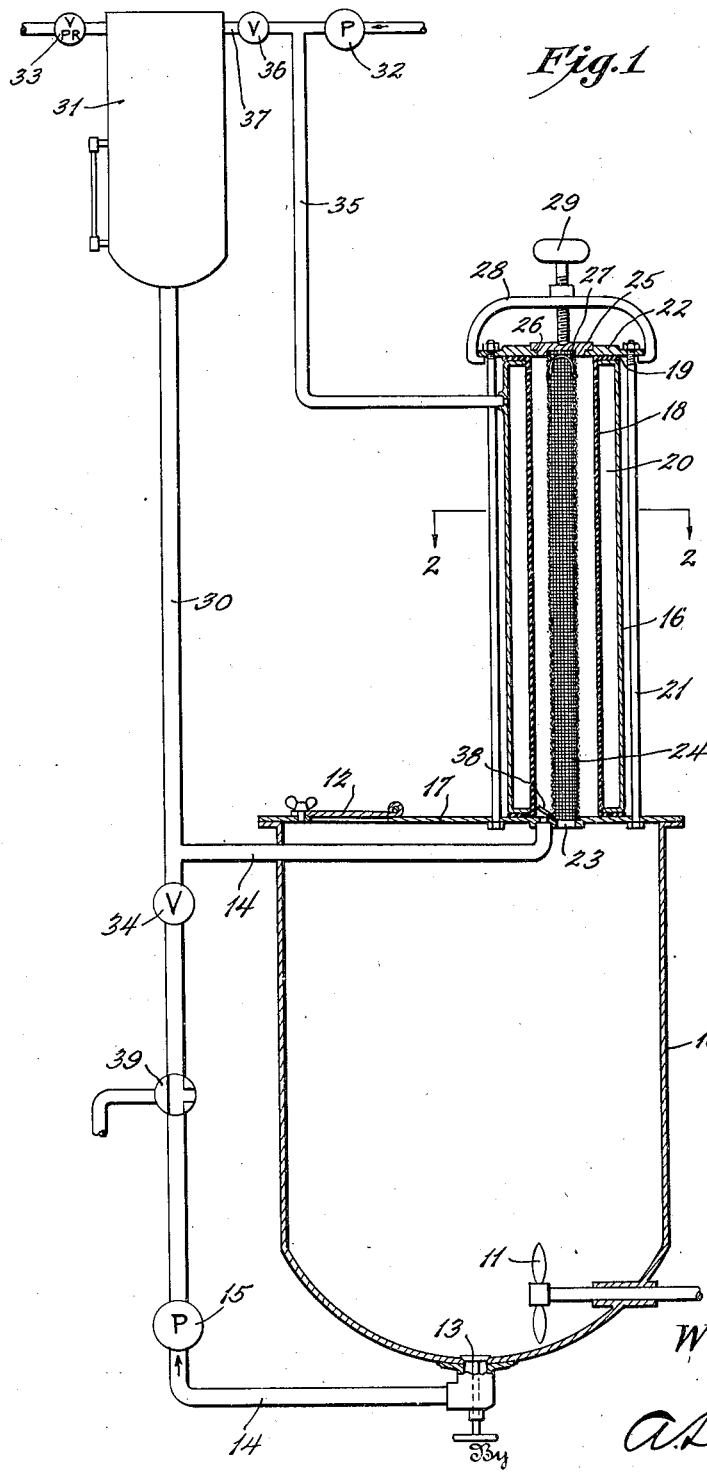
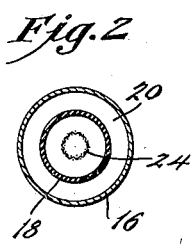
Inventor
Wm. H. Jackson
By A. D. Adams
Attorney Patented Apr. 25, 1944

2,347,322

UNITED STATES PATENT OFFICE 2,347,322

METHOD OF EXTRACTING DRUGS

William H. Jackson, Great Neck, N. Y.

Substituted for abandoned application Serial No. 118,696, December 31, 1936. This application March 7, 1941, Serial No. 382,223

6 Claims. (Cl. 99—140)

This invention relates to a method of extracting drugs and, among other objects, aims to provide a greatly improved process of making extracts of drugs containing cellulose fibers, such, for example, as vanilla, henbane, belladonna, rhubarb and the like. The main object is to provide a simplified arrangement whereby the extracts may be made without the application of heat and a highly efficient process which can be carried out in a fraction of the time required by the well known processes now in use.

This application is a substitute for my application Ser. No. 118,696, filed December 31, 1936.

Other aims and advantages of the invention will appear in the specification, when considered in connection with the accompanying drawing, wherein:

Fig. 1 is a vertical sectional view, partly in elevation, showing a simplified form of the improved apparatus adapted to be used in practicing the method; and Fig. 2 is a cross section, taken on the line 2—2 of Fig. 1.

In accordance with the usual practice of making extracts of friable or woody drugs, the drug is usually ground to a fine consistency and the extract is obtained therefrom by percolation. Fine grinding, however, causes the drug pulp to form a more or less impermeable mass through which the menstruum flows or passes very slowly by enlarging the channels or passages therein. Hence, the process is necessarily slow and the efficiency of extraction is quite limited. Some methods employ heat to hasten the extraction, but heat tends to destroy the flavor or aroma of the extract. Moreover, the finely ground drug retains too much menstruum which cannot easily be drained by gravity. The use of pressure on the mass involves further handling and detrimental exposure to the air, as well as other objectionable features.

In accordance with the present invention, drugs of the type mentioned, more especially vanilla, are readily extracted by feeding the natural drug stock into a tank containing the menstruum and chopping up the stock, preferably by a suitable rotating propeller driven at the proper speed until the fibers in the stock are of a predetermined length, say, about ½ inch long. The speed of the propeller is so controlled as to prevent further cutting or breaking up of the fibers. The agitation is continued, however, and causes the pulpy matter to wear away from the relatively tough fibers by attrition. Then, the menstruum is pumped from the container into a filtering chamber, wherein the mass is compressed and formed into a substantially uniform filter cake of felted or matted fibers, conveniently in the form of a cylinder around a screen through which the menstruum may be pumped repeatedly or continuously to purify it. The fibers resist disintegration of the filter cake and also make it permeable and efficient. The extract obtained from the filter is preferably run back into the original container, from which it is repeatedly pumped through the filter cake until it is clear. As the circulation through the filter cake continues, the finest particles of insoluble matter are washed from the inner surface of the cake through the screen and are finally deposited and collected on the outer face of the cake so that the particles are retained in the cake upon subsequent squeezing and do not discolor or becloud the extract. The cake is preferably finally compressed under high pressure to squeeze out as much of the contained menstruum as possible.

After the extract is sufficiently filtered, it is preferably removed from the main tank. At the end of the filtering operation, the pump may be stopped and the filter cake squeezed further to remove residual menstruum. Also, the filter cake may be washed with either fresh or used solvent to reclaim as much of the extractable matter as possible. Then the solvent wash, diluted with extract, is removed from the tank, so that it may be used in the next menstruum. The filter cake may also be finally washed with water pumped through it until practically all of the reclaimable solvent is recovered and drained into the tank. However, the solvent may be recovered in various well known ways. The tank is again drained of wash water diluted with solvent, which is stored to be used in making up the next batch of washing solvent for the next filter cake. The filter cake, with its cylindrical screen, is removed from the filter chamber and stripped off the screen. Then, the screen is replaced and the process is repeated on a new batch.

Referring particularly to the disclosed apparatus for practicing the method of extracting drugs there is shown a main tank 10 having a round bottom. Within the tank, near the bottom is shown a propeller 11 having blades so designed as to cut or break the drug stock or material passing through them. It is designed to cut fibers into the proper length to make a good filtering mass. The menstruum and drug stock are supplied through a door 12. The bottom of the tank has a valved outlet 13 to which is connected a pipe or conduit 14 having a pump 15 adapted to remove the drug mass after it has been agitated in the tank and the soft pulpy material thoroughly worn off of the fibers by attrition and by friction against the tank walls. The material is pumped into a filtering chamber which is shown as comprising a flanged metal cylinder 16 secured to the top wall 17 of the tank 10. Cooperating with the cylinder 16 is a cylindrical inner rubber sleeve 18 having flanges 19 at its upper and lower ends to form an annular closed chamber 20 between the metal cylinder and the inner rubber wall. The flanges of the rubber cylinder are shown as being clamped against the ends of the metal cylinder 16 by the bolts or tie rods 21 passing through the top wall 17 of the tank and an annular ring-shaped head 22.

The top wall 17 of the tank has a counterbored drain opening 23 within which is seated a small cylindrical screen 24 preferably formed of heavy wire mesh or a perforated cylinder extending to the upper end of the filter. The filtering chamber is shown as being closed by a closure plug 25 seated in a counterbored opening 26 in the clamping ring or head 22. This closure plug is shown as having a recess 27 to receive the upper end of the cylindrical screen and hold it properly centered in the filter. To hold the closure plug seated, there is shown a clamp 28 engaging the clamping ring 22 and having a thumb screw 29 acting against the closure plug. The pulpy drug mass is pumped into the space or chamber surrounding the screen, thereby causing the rubber cylinder to expand outwardly toward the metal wall 16. When the filter chamber is filled with the mass, the remainder of the batch in the tank may be pumped through a branch pipe 30 into a storage tank 31 against air pressure provided by an air pump 32 which is kept constant by a suitable pressure relief valve 33. However, when a relatively large filter chamber is employed, the storage tank may be eliminated.

After all of the pulpy mass is pumped out of the tank 10 into the filter and the storage tank 31, the mass in the filter is adapted to be squeezed initially by fluid pressure introduced into the chamber 20 between the metal cylinder 16 and the rubber cylinder 18. To do this, a cut-off valve 34 arranged in the pipe line 14 below the overflow branch 30 is adapted to be closed. Air pressure is preferably introduced into the chamber 20 by a conduit 35 leading from the air pump 32. To increase the pulp capacity of the cylinder, it is desirable to use pressure initially to squeeze the mass within the chamber and produce a more substantially uniform filter cake. To this end, a valve 36 is arranged in the air conduit 37 leading to the storage tank and the air pump may be speeded up to increase the pressure in the filtering chamber without increasing the pressure in the overflow tank. In some instances, water under pressure may be employed instead of air, to exert the squeezing pressure. Also, it is contemplated that the squeezing pressure applied by the pump will be sufficient to make a filter cake of vanilla bean fibers and the like. After the filter cake has been formed by the excess pressure and given an initial set, the air pressure may be reduced by opening the valve 36 so that the pressure against the rubber cylinder will be equalized with that in the overflow tank. Then, the air pressure in the storage tank, which is arranged above the level of the filter, plus the hydraulic head of the mass will overcome the air pressure against the rubber wall and the fluent mass will rise in the filtering chamber, distending the rubber slightly away from the filter cake. Incidentally, the mass flows into the bottom of the filter through a flap valve 38 which closes when squeezing pressure is applied to the filter. The mass from the storage tank will continue to flow into the filter and practically all of the extract will be forced through the filter cake and screen into the tank 10.

The extract in the tank 10, if it is sufficiently clear, will be pumped out through a three-way valve 39. However, it may be pumped one or more times through the filter to clarify it as much as is desired before it is removed or pumped out.

After the extract is removed or pumped from the tank, some fresh solvent is poured or introduced into the tank, preferably through the filling door 12. Then the solvent is pumped through the filter cake to remove as much residual, extractable matter as possible. Then, this solvent, with the reclaimed residue, may be removed and stored for making up the next batch of menstruum. This reclaiming step may be repeated, depending upon the nature of the soluble constituents of the drug being extracted. Thereafter, water may be poured into the tank and pumped through the filter cake to reclaim the residual solvent therefrom which is removed and stored for making up the next batch of washing solvent. The filter cake and the cylindrical screen are then removed from the filter by unscrewing the clamping screw 29 and removing the closure plug 25. The cake or marc is cleaned off the screen and the screen replaced. In some instances, a strip of coarse cheese cloth may be wrapped spirally around the filter screen to facilitate removal of the cake or marc by unwrapping the cloth and thereby reduce contamination of the screen. The operations are then repeated to produce the next batch of extract. The solvent wash from the previous batch is used to make up the extractable menstruum for the second batch. The reclaimed solvent in the wash water used on the previous filter cake is then used to make up solvent wash for the second cake.

The operation of the illustrative apparatus for making vanilla extract, for example, is as follows: The menstruum, which consists of a mixture of water and alcohol, is first introduced into the tank 10 and the propeller 11 is started. The vanilla beans are gradually fed into the tank through the door 12 to make up the desired batch. The door 12 is then closed. The beans are first cut up into a coarse pulp by the propeller blades and then converted into a pulpy fibrous mass by attrition, due to rapid circulation and agitation. The outlet valve 13 is then opened and the pump 15 started. Some of the mass is pumped into the filter between the screen 24 and the rubber membrane 18, some of the extract readily passing through the screen into the tank. At the same time, some of the mass rises in the branch pipe 30 against air pressure in the storage tank 31 supplied by the pump 32. It will, of course, be understood that several filters of the type shown may be employed.

When all of the mass is pumped out of the tank 10, the pump 15 may be stopped and the valves 13 and 34 are closed. The valve 36 is closed, so that all of the air from the pump is delivered to the chamber 20. The air pump is speeded up to apply considerable pressure through the rubber membrane to the mass in the filter. This pressure squeezes the mass in the filtering chamber, forcing the extract through the screen and making a matted filter cake of the fibrous pulp. Then, the valve 36 is opened to equalize the pressure in the chamber 20 and the storage tank 31 above the pulp. As previously stated, the squeezing pressure may be supplied by the pump instead of the membrane. The stored mass in the tank 31 will then flow through the branch 30 and the pipe 14 into the filter between the cake and the rubber membrane, as previously explained, and the pressure supplied by the air pump is sufficient to force the extract through the filter cake.

After the first filtering operation is completed and the cloudy extract is delivered back to the tank 10, the valves 13 and 34 are opened and the extract pumped back through the filter and into the storage tank in the same manner as was the pulpy mass. The valves 13 and 34 are again closed and all of the extract again filtered through the filter cake. This operation may be repeated as often as necessary to produce the desired clarity of the extract. After these operations are completed, the valve 13 is again opened and the valve 39 turned to discharge the extract. The pump 15 will then empty the tank through the discharge line and the extract will be stored in closed containers. Then, the filter cake is successively washed with solvent wash, as hereinbefore explained, after which final squeezing pressure is applied to the cake and the cake is removed. The screen is then replaced for the next extracting operation.

From the foregoing description, it will be seen that the method is especially adapted to make extracts from vanilla and other drugs. The whole process is carried out in a closed system in which pressure may be maintained and no solvent or volatile matter will be lost. The time required for completing the operation on a batch of vanilla is reduced to a few hours.

Obviously, the invention is not restricted to the particular form of apparatus disclosed nor to a strict conformity with the described steps of the method.

What is claimed is:

1. The method of producing extract of vanilla from the crude drug which is characterized by introducing a batch of the crude drug with its extractive liquid into a container; cutting up and agitating the drug to convert it into filter fibers about ½ inch long and a finely divided pulpy mass; continuing the agitation and pumping a portion of the turbid batch through a filter strainer to deposit the filter fibers and pulp on the strainer; stopping the pumping operation and squeezing the fibers and retained pulpy mass against the filter strainer to form a filter cake; returning the turbid extract squeezed out of the cake to the container and then forcing the turbid extract with the remaining pulpy dregs left in the container through the filter cake.

2. The method of producing extract of vanilla from the crude drug which is characterized by introducing a batch of the crude drug with its extractive liquid into a container; cutting up and agitating the drug to convert it into filter fibers about ½ inch long and a finely divided pulpy mass; pumping a portion of the batch through a filter strainer to deposit the filter fibers and solid pulp on the strainer; returning the liquid extract in the pumped mass back into the container; squeezing the fibers and retained pulpy mass against the strainer to make a filter cake of the fibers; and finally pumping the turbid extract from the container through the filter cake until it is substantially clear.

3. That method of producing extract of vanilla which is characterized by making up a batch of drug pulp having pieces of fiber of a predetermined length capable of forming a uniform filter cake and mixing the pulp with an extracting liquid; delivering the pulpy mass to a container carrying a screen filter and filling the filter container with the fibers and pulp from which some of the extract passes through the screen; returning the extract to the batch container; interrupting the delivery and squeezing the pulpy mass against the screen to form a filter cake and force more of the extract through the screen; releasing the cake from the squeezing action; and then filtering the turbid extract and pulpy dregs through the filter cake.

4. The method of producing extract of vanilla from the crude drug which is characterized by introducing a batch of the crude drug with its extractive liquid into a container; cutting up and agitating the drug to convert it into filter fibers about ½ inch long and a finely divided pulpy mass; delivering the batch under pressure to a filter strainer; forming a filter cake of the fibers on the strainer as the extract passes therethrough; then returning the turbid extract which passed through the strainer when forming the cake, back through the cake to clarify it; and finally applying squeezing pressure to the cake after the extract has been sufficiently clarified to remove the extract contained therein.

5. The method of producing extract of vanilla from the crude drug which is characterized by introducing a batch of the crude drug with its extractive liquid into a container; cutting up and agitating the drug to convert it into relatively long filter fibers and a finely divided pulpy mass; pumping a portion of the batch from the bottom of the container through a filter strainer and depositing the fibers thereon; compressing the pulpy mass and forming a filter cake on the strainer; returning the initial turbid liquid to the container; forcing the remainder of the batch and the turbid extract through the filter cake; and reclaiming residual extract from the filter cake after filtration is completed.

6. That method of making extracts from cellulose bearing drugs which is characterized by cutting up the crude drug in the presence of its menstruum to produce a fibrous pulp; agitating the mass to remove soft pulp from the fibrous portions by attrition; pumping a portion of the turbid pulp through a filter screen and depositing the fibers thereon; compressing the removed pulpy mass against the screen to form a filter cake; returning the squeezed extract to mix with the agitated mass; and continuously pumping the remainder of the batch and the extract through the cake until the extract is clarified.

WM. H. JACKSON.